(12) United States Patent
Schneider

(10) Patent No.: US 9,540,986 B2
(45) Date of Patent: Jan. 10, 2017

(54) CONTROL VALVE FOR A LUBRICANT NOZZLE

(71) Applicant: MAN Truck & Bus AG, Munich (DE)

(72) Inventor: Thomas Schneider, Stein (DE)

(73) Assignee: MAN TRUCK & BUS AG, Munich (DE)

( * ) Notice: Subject to any disclaimer, the term of this patent is extended or adjusted under 35 U.S.C. 154(b) by 178 days.

(21) Appl. No.: 14/482,918

(22) Filed: Sep. 10, 2014

(65) Prior Publication Data

US 2015/0068471 A1    Mar. 12, 2015

(30) Foreign Application Priority Data

Sep. 11, 2013  (DE) .......................... 10 2013 014 930

(51) Int. Cl.

| F02F 1/14 | (2006.01) |
|---|---|
| F01P 3/08 | (2006.01) |
| F01M 1/08 | (2006.01) |
| F01P 7/14 | (2006.01) |
| G05D 7/01 | (2006.01) |
| F02F 1/16 | (2006.01) |
| F02B 3/06 | (2006.01) |

(Continued)

(52) U.S. Cl.
CPC . *F01P 3/08* (2013.01); *F01M 1/08* (2013.01); *F01P 7/14* (2013.01); *G05D 7/0126* (2013.01); *F01L 1/0532* (2013.01); *F01M 1/16* (2013.01); *F01P 2007/146* (2013.01); *F02B 3/06* (2013.01); *F02F 1/002* (2013.01); *F02F 1/14* (2013.01); *F02F 1/16* (2013.01)

(58) Field of Classification Search
CPC ................ F02F 1/14; F02F 1/16; F02F 1/002; F02B 3/06; F01L 1/0532
USPC ....................................................... 123/41.8
See application file for complete search history.

(56) References Cited

U.S. PATENT DOCUMENTS

| 5,664,531 A * | 9/1997 | Kim .......................... F01L 1/46 123/90.15 |
|---|---|---|
| 7,536,971 B1 * | 5/2009 | Fry ....................... B63B 35/815 114/361 |

(Continued)

FOREIGN PATENT DOCUMENTS

| DE | 102 61 180 A1 | 7/2004 |
|---|---|---|
| DE | 10 2010 023 876 A1 | 11/2011 |
| EP | 2 213 851 A2 | 8/2010 |

*Primary Examiner* — Lindsay Low
*Assistant Examiner* — Charles Brauch
(74) *Attorney, Agent, or Firm* — Lucas & Mercanti, LLP

(57) ABSTRACT

A control valve for a lubricant nozzle for cooling a piston of an internal combustion engine includes at least one passage opening through which lubricant can flow, a control part which is movable in a respective movement direction and which, as a function of its position, forms an opening cross section with the passage opening for at least partially opening up or for closing off the passage opening, and an actuation part which moves the control part as a function of a pressure of the lubricant between at least one first position in the presence of a first pressure, a second position in the presence of a second pressure and a third position in the presence of a third pressure of the lubricant. The second pressure is higher than the first pressure and lower than the third pressure, wherein the opening cross section formed in the second position is larger than the opening cross sections in the first position and in the third position.

15 Claims, 4 Drawing Sheets

(51) Int. Cl.
 *F01L 1/053* (2006.01)
 *F02F 1/00* (2006.01)
 *F01M 1/16* (2006.01)

(56) References Cited

U.S. PATENT DOCUMENTS

2002/0134326 A1* 9/2002 Araki ..................... F02B 63/02
 123/73 A
2005/0252997 A1 11/2005 Gluck
2011/0283968 A1* 11/2011 Anderson ................ F01M 1/08
 123/196 R

* cited by examiner

CONTROL VALVE FOR A LUBRICANT NOZZLE

CROSS-REFERENCE TO RELATED APPLICATIONS

This application claims the priority of DE 10 2013 014 930.4 filed Sep. 11, 2013, which is incorporated by reference herein.

BACKGROUND OF THE INVENTION

The invention relates to a control valve for a lubricant nozzle, in particular for an oil spray nozzle, for cooling a piston of an internal combustion engine. The invention also relates to a lubricant nozzle and to a lubricant supply device for a reciprocating-piston engine of a motor vehicle.

It is known from the prior art for oil spray nozzles to be used for piston cooling purposes. Here, the oil is sprayed via the nozzle onto those locations on the piston which are to be cooled. Here, by means of a valve, in a manner dependent on the type of construction and configuration, the oil supplied via the oil spray nozzle can be controlled as a function of various parameters. In the case of a valve of said type, it is for example the case that a displacement of a spring-loaded regulating piston takes place, whereby an opening is opened up, through which the oil can then pass via the nozzle to the piston.

DE 102 61 180 A1 discloses a generic valve for lubricant ducts of motor vehicles, having a control part which is assigned to a control opening and which, by means of at least one first actuation part, is preloaded into at least one end position, which closes the control opening, within a valve housing and which, by means of at least one second actuation part, can be moved into an open position. Here, the pressure force exerted on the control part by the lubricant via the control opening runs perpendicular to the direction of movement of the control part. Owing to the fact that the pressure force exerted on the control part by the lubricant via the control opening acts perpendicular to the movement of the control part, the first and second actuation parts can be designed to be correspondingly small.

DE 10 2010 023 876 A1 discloses a control valve having at least two actuation parts by means of which a control part can be moved between at least two positions, wherein at least one of the actuation parts can be electrically actuated in order to move the control part between the positions.

EP 2 213 851 A2 discloses an oil supply device for the lubrication of a cylinder and/or for the cooling of a piston, wherein the oil supply device is designed such that lubrication of the cylinder takes place continuously, whereas the cooling of the piston is switchable, and/or such that the lubrication of the cylinder takes place already in the presence of a relatively low oil pressure at which cooling of the piston does not yet take place.

A disadvantage of the valves for oil spray nozzles known from the prior art is that they do not make it possible in all operating situations to realize a supply of the lubricant to the piston, and cooling of the piston by means of the lubricant, in accordance with demand.

BRIEF SUMMARY OF THE INVENTION

It is an object of the invention to provide a control valve for a lubricant nozzle, in particular for an oil spray nozzle, for cooling a piston of an internal combustion engine, which avoids the disadvantages of conventional control valves. In particular, the control valve should permit opening and closing of the control valve in accordance with demand.

The invention is based on the realization that, in the case of the known lubricant spray nozzles, a supply of lubricant to the piston that does not satisfy demand can be caused by the fact that an excessively high coolant oil flow rate at full load can lead to backing-up effects in the piston cooling duct. When such backing-up effects occur, lubricant fed subsequently can no longer be conducted in adequate quantities into the interior of the piston, leading to inadequate piston cooling. Oil spray nozzles of excessively small design may in turn have the effect that, at low engine speeds, the piston is again supplied with inadequate quantities of oil. These effects can be avoided by the present invention.

The invention therefore encompasses the general technical teaching that, in an upper engine speed range, or in the presence of high pressures of the fed lubricant, an opening cross section via which the lubricant is fed to the lubricant spray nozzle is reduced in relation to a medium engine speed range, or medium pressures of the fed lubricant, by the control valve for the purpose of throttling the feed of lubricant. Backing-up effects can be reliably prevented in this way.

The control valve according to an embodiment of the invention for a lubricant nozzle for cooling a piston of an internal combustion engine has, in correlation with the prior art, at least one passage opening through which lubricant can flow. The passage opening is open to the outside such that lubricant emerging from the passage opening can be conducted onward to the lubricant spray nozzle for example via a feed line. The control valve furthermore comprises a control part which is movable in a respective movement direction and which, as a function of its position, forms an opening cross section with the passage opening for at least partially opening up or for closing off the passage opening.

The control valve furthermore comprises an actuation part that can move the control part, as a function of a pressure of the lubricant in the lubricant feed between at least one first position in the presence of a first pressure, a second position in the presence of a second pressure and a third position in the presence of a third pressure of the lubricant. Here, the second pressure is higher than the first pressure and lower than the third pressure. The pressure of the lubricant is the lubricant pressure in the lubricant feed at the inlet of the control valve. The lubricant is conveyed to the control valve inlet by a pump, which is typically coupled to the speed of the engine, such that the lubricant pressure upstream of the control valve rises with increasing engine speed. Oil may be used as lubricant, such that hereinafter the expressions "oil" and "oil spray nozzle" will also be repeatedly used as alternatives to the expressions "lubricant" and "lubricant spray nozzle".

According to general aspects of the invention, the opening cross section formed in the second position is larger than the opening cross sections in the first position and in the third position. In this way, an engine-speed-dependent supply of coolant to the piston in accordance with demand can be realized while avoiding backing-up effects. It is accordingly possible, for example at an idle engine speed or in a low engine speed range, where there is no demand for cooling oil or only a low demand for cooling oil, for the control part to be moved into the first position in order to close the passage opening or in order to open up only a small opening cross section. Oil spray nozzles of excessively small design may in turn have the effect that, at low engine speeds, the piston is again supplied with inadequate quantities of oil. These effects can be avoided by the present invention. In the medium engine speed range, the control part, in the second position, can form a large, preferably maximum opening cross section with the passage opening. In a high engine speed range, and accordingly in the presence of high lubricant pressures, the control part, in the third position, reduces the opening cross section such that an excessively high oil throughput is avoided in order to prevent backing-up effects in the piston cooling duct. The oil throughput is dependent on the size of the opening cross section that is formed and on the lubricant pressure.

In one preferred embodiment of the invention, the control part is movable in continuous fashion between the first, second and third positions, and the actuation part is designed to set the position of the control part, and thus the opening cross section, such that a gradient of a lubricant throughput is smaller in an upper pressure range of the lubricant than in a medium pressure range. In this way, an excessive increase in lubricant throughput owing to the high pressure is prevented. The gradient of a lubricant throughput is the gradient of the profile of the lubricant throughput through the control valve as a function of the engine speed and/or as a function of the lubricant pressure at the valve inlet. For example, experimental tests may be performed in order to determine the optimum profile curve of the lubricant throughput as a function of the lubricant pressure in an upper pressure range, which optimum profile curve permits adequate piston cooling and simultaneously prevents the occurrence of backing-up effects. The actuation part and the control part and the passage opening may then be correspondingly configured such that the lubricant throughput is controlled by the control valve in accordance with the optimum profile curve.

It is particularly advantageous for the position of the control part and thus the opening cross section to be set such that a substantially constant lubricant throughput through the passage opening is realized in an upper pressure range of the lubricant. This is based on the inventors' observation that such a profile permits optimum piston cooling and prevents backing-up effects in an effective manner. A constant lubricant throughput may be realized by corresponding configuration and tuning of the control valve. For this purpose, the reduction in throughput of the coolant with increasing lubricant pressure by a decrease in size of the opening cross section is set such that, in this way, the increase in throughput of the coolant per unit of surface area as a result of the increasing pressure is compensated.

It is likewise possible for the coolant throughput in the upper pressure range or in the upper engine speed range to be set so as to have a concave profile.

In a preferred embodiment, the pressure force exerted by the lubricant on the control part by way of an effective surface of the control part acts on the control part at least substantially in the direction of one of the movement directions of said control part. In particular, the pressure force acts in the movement direction in which the control part must be moved in order to partially or fully open up the passage opening of the control valve. The passage opening and thus the control valve can then be opened as a result of the setting of a particular pressure of the lubricant. The pressure force exerted on the control part moves the control part when an opposing force exerted on the control part by the actuation part, in particular preload force, is overcome. It is preferably thus the case that an actuation travel of the control part increases with increasing pressure force of the lubricant.

It is preferable for the control part to be in the form of a piston and to be guided within a cylindrical recess of a control valve housing, for example in a sliding bushing, wherein the passage opening is provided in the cylindrical guide surface of the recess for the control part. The embodiment as a piston ensures simple and relatively low-friction guidance for the control part. Furthermore, the abutment surfaces that limit the control movement of the control part can be realized in a simple manner.

In one advantageous variant of this embodiment, the piston has, in its piston skirt, an opening, in particular a radial opening, through which lubricant can flow and which, at one side, is connected in communicating fashion via a piston interior to the lubricant feed and which, at the other side, when the piston is in a predetermined position range, forms a communicating connection to the passage opening. The opening cross section is formed from an overlap of the passage opening and of the radial opening. A further possibility afforded by the implementation according to the invention is that, with increasing pressure of the lubricant, the piston is moved toward the actuation part, such that the overlap increases from the first to the second position and subsequently decreases again from the second to the third position.

A particular advantage of this embodiment thus lies in the fact that an opening cross section between control part and passage opening can be realized which increases in stepped fashion and decreases in stepped fashion with a single linear travelling movement of the control part.

The actuation part is preferably in the form of a spring element, where the control part can be moved into the various positions under the action of a spring force exerted by the spring element. The spring element may for example be in the form of a spiral spring or leaf spring. This has the advantage that it is possible to provide a robust and inexpensive control valve with a simple construction, a small structural space requirement and a mechanical actuation mechanism.

In said design variant with the spring element, the oil throughput is dependent inter alia on the spring characteristic curve and on the pressure-dependent opening-up of the opening cross section. Through tuning of the spring characteristic curve or of the spring characteristic and of the size of the passage opening and radial opening, the control valve can be adapted to the engine-specific cooling oil flow rate demand in a simple manner in terms of construction.

It is preferable for the passage opening to be formed by an annular duct or an annular groove which is introduced into a control valve housing and into a further component, for example a sliding bushing or cylindrical guide for the control part.

A further aspect of the invention relates to a lubricant supply device for a reciprocating-piston engine of a motor vehicle, in particular of a utility vehicle, having at least one lubricant spray nozzle, in particular an oil spray nozzle, by means of which at least one piston of the reciprocating-piston engine can be sprayed with lubricant, and at least one lubricant feed by means of which the lubricant can be fed to the lubricant spray nozzle. A control valve according to one of the aspects described above is arranged upstream of the lubricant spray nozzle as viewed in the flow direction of the lubricant to said lubricant spray nozzle. The control valve sets a flow rate of the lubricant to be fed to the lubricant spray nozzle. It is advantageously the case that each piston of the reciprocating-piston engine is assigned at least one lubricant spray nozzle.

A possibility afforded by the implementation according to the invention is that the lubricant supply device has a multiplicity of lubricant spray nozzles, wherein a separate control valve according to the aspects described above is arranged upstream of each lubricant spray nozzle, the control valve setting a flow rate of the lubricant to be fed to the lubricant spray nozzle. The control valves are thus installed in a decentralized configuration.

It is alternatively also possible for a central control valve according to the aspects described above to be provided, which control valve is arranged in a lubricant gallery in order that the lubricant flow rate to be fed is set centrally for all of the lubricant spray nozzles.

A further aspect of the invention relates to a motor vehicle, in particular utility vehicle, or an internal combustion engine having a control valve and/or a lubricant supply device according to one of the embodiments described above.

It is basically the case that, in the described teaching, the engine cooling system and thus also the oil spray nozzle are fed from a constant-displacement pump that is coupled to the engine speed. There is thus a direct dependency between the engine speed and the delivery pump performance. The described configuration, in which the piston successively reduces the cross-sectional opening again in the upper engine speed range so as to yield a substantially constant lubricant throughput through the passage opening, is advantageous in particular in the case of the constant-displacement pump.

As an alternative to a constant-displacement pump coupled to the engine speed, it is also possible for use to be made of an oil pump that is regulated in accordance with demand, for example a regulable oil pump that is electrically, pneumatically or hydraulically controllable. Through the use of the invention, it is in principle the case that the cooling oil demand of the piston and thus also the supply to other consumers situated in the oil circuit are controlled/influenced. In the case of the oil pump regulated in accordance with demand, it may preferably be provided that a reduction in the opening cross section, and thus a reduction of the lubricant throughput through the passage opening, occurs in the upper engine speed range, resulting in reduced piston cooling and an increased supply of oil (lubrication and/or cooling) to other regions of the engine. For example, at relatively high engine speed, and with the reduction of the lubricant throughput at the passage opening, it is possible to realize a reduced cooling action at the piston and increased lubrication and/or cooling of other regions of the engine. Altogether, a relative supply of oil to the one or more pistons and to other engine regions can be influenced indirectly by oil pressure variation by means of the oil pump that is regulated in accordance with demand. It is also possible by means of the control valve for opposing behaviour between the oil pressure set by regulation and the required cooling oil demand to be compensated.

Further details and advantages of the invention will be described below with reference to the appended drawings, in which:

DETAILED DESCRIPTION OF THE PREFERRED EMBODIMENT

Figure 1:
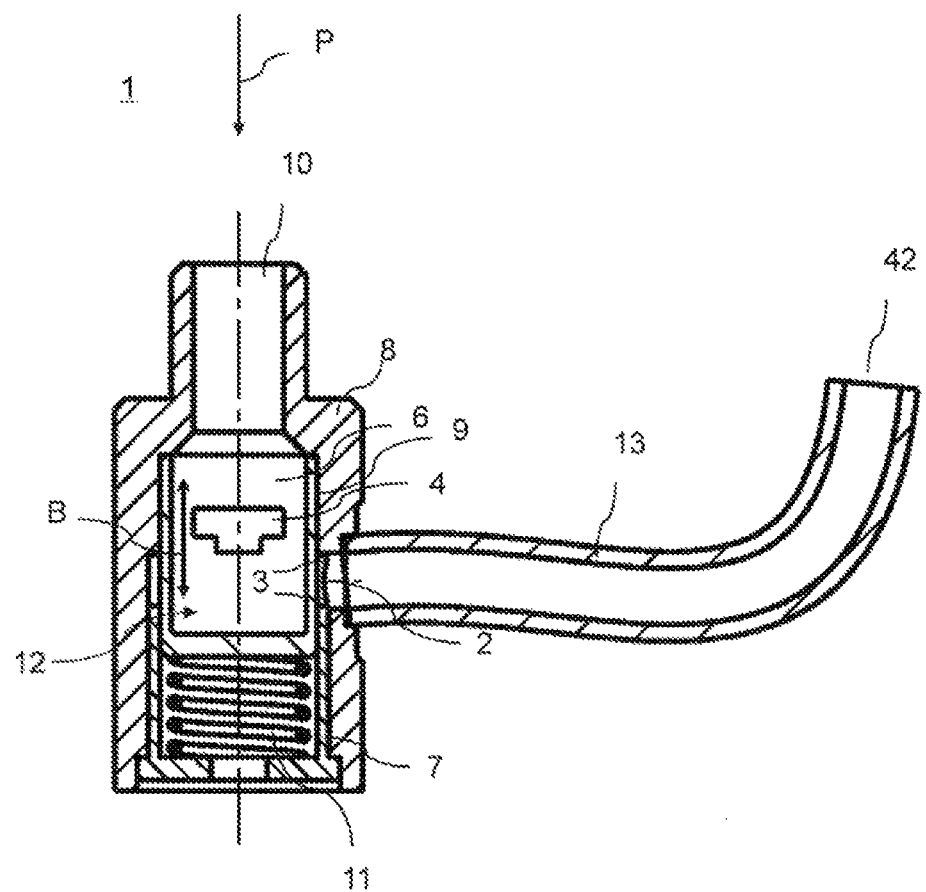
FIG. 1 is a sectional view of a control valve for an oil spray nozzle according to one exemplary embodiment of the present invention.

FIG. 1 shows a control valve 1 designed to be arranged in an oil duct of an internal combustion engine and positioned upstream of an oil spray nozzle. Here, by means of the control valve 1, the oil duct can be opened and closed in accordance with demand, and thus lubricating oil can be supplied to the oil spray nozzle in accordance with demand. By means of the oil spray nozzle, a piston, which is assigned to the oil spray nozzle, of the internal combustion engine in the form of a reciprocating-piston engine can be sprayed with the lubricating oil flowing through the oil duct and can thus be cooled.

The control valve 1 comprises a valve housing 8 and a control part which is in the form of a valve piston 6. The valve piston 6 is mounted in the valve housing 8 so as to be movable in the direction denoted by the arrow B, and is preloaded into a closing position by an actuation part. Here, the actuation part 11 is for example in the form of a spring element 11, in particular a helical spring, spiral spring or leaf spring.

Also provided in the valve housing 8 is a passage opening 2 through which lubricant can flow and via which oil that emerges from the control valve 1 can be conducted onward for example via a feed line 13 to the oil spray nozzle 42. The passage opening is in the form of an annular duct or annular groove, and is delimited by upper and lower opening edges 3.

The control valve 1 also comprises a sliding bushing 7 which is received in the control valve housing 8 and by means of which the piston 6 is guided. Here, the passage opening 2 is arranged in the sliding bushing 7. The guidance and the relative mobility of the piston 6 with respect to the sliding bushing 7 ensures a reliable and jamming-free movement of the piston 6, and thus high functional reliability of the control valve 1. The sliding bushing 7 and/or the piston 6 may in this case for example be manufactured from a hardened material and inserted into the housing 8 of the control valve 1.

Here, the open side of the valve piston 6, which has a U-shaped cross section, faces toward the lubricant feed 10. In its piston skirt 9, the valve piston 6 has a radial opening 4 through which lubricant can flow, which radial opening, at one side, is connected in communicating fashion via a piston interior 12 to the lubricant feed 10 and, at the other side, when the piston 6 is in a predetermined position range, forms a communicating connection to the passage opening 2. In said predetermined position range, it is possible for lubricant that has flowed into the piston interior volume 12 via the lubricant feed 10 to emerge from the control valve via the radial opening 4 and the passage opening 2 and to be supplied to the oil spray nozzle via the lubricant line 13. This will be explained in more detail below.

As indicated by the directional arrow P in FIG. 1, the pressurized lubricating oil that enters via the lubricant feed 10 exerts a pressure force on the piston 6, which pressure force is directed in the axial direction of movement B of the piston 6 in which the piston 6 is moved in order to open or close the passage opening 2 and thus the oil duct. Through suitable presetting of the preload force that is exerted on the piston 6 by the spring 11, for example by tuning of the spring characteristic curve, it is possible to achieve a situation in which the control valve 1 and thus the lubricant duct are opened, and optionally also closed, in the presence of a certain pressure of the lubricating oil.

With increasing pressure of the lubricant, the piston 6 is moved toward the spring 11, such that the radial opening 4 is moved past the passage opening 2. Depending on the position of the piston, an opening cross section via which the lubricant can emerge from the control valve 1 takes on a different size as a function of the overlap of the passage opening 2 and of the radial opening 4. In particular, in high pressure ranges of the lubricant, the piston may be moved to such an extent that the overlap and thus the opening cross section are reduced again.

This will be explained in more detail below on the basis of FIGS. 2A to 2E.

FIGS. 2A-2E schematically illustrate different opening cross sections as a function of the piston position according to one exemplary embodiment, in order to illustrate the mode of operation of the control valve 1. To simplify the illustration, in each case only the radial opening 4 and the passage opening 2 of the control valve 1 are illustrated in FIGS. 2A-2E. In the present exemplary embodiment, the radial opening 4 has a pentagonal cross section. The radial opening may however also have any other desired cross section. To simplify the illustration, the passage opening 2 in the form of an annular groove is illustrated "in a developed view" in the plane of the drawing.

Figure 2:
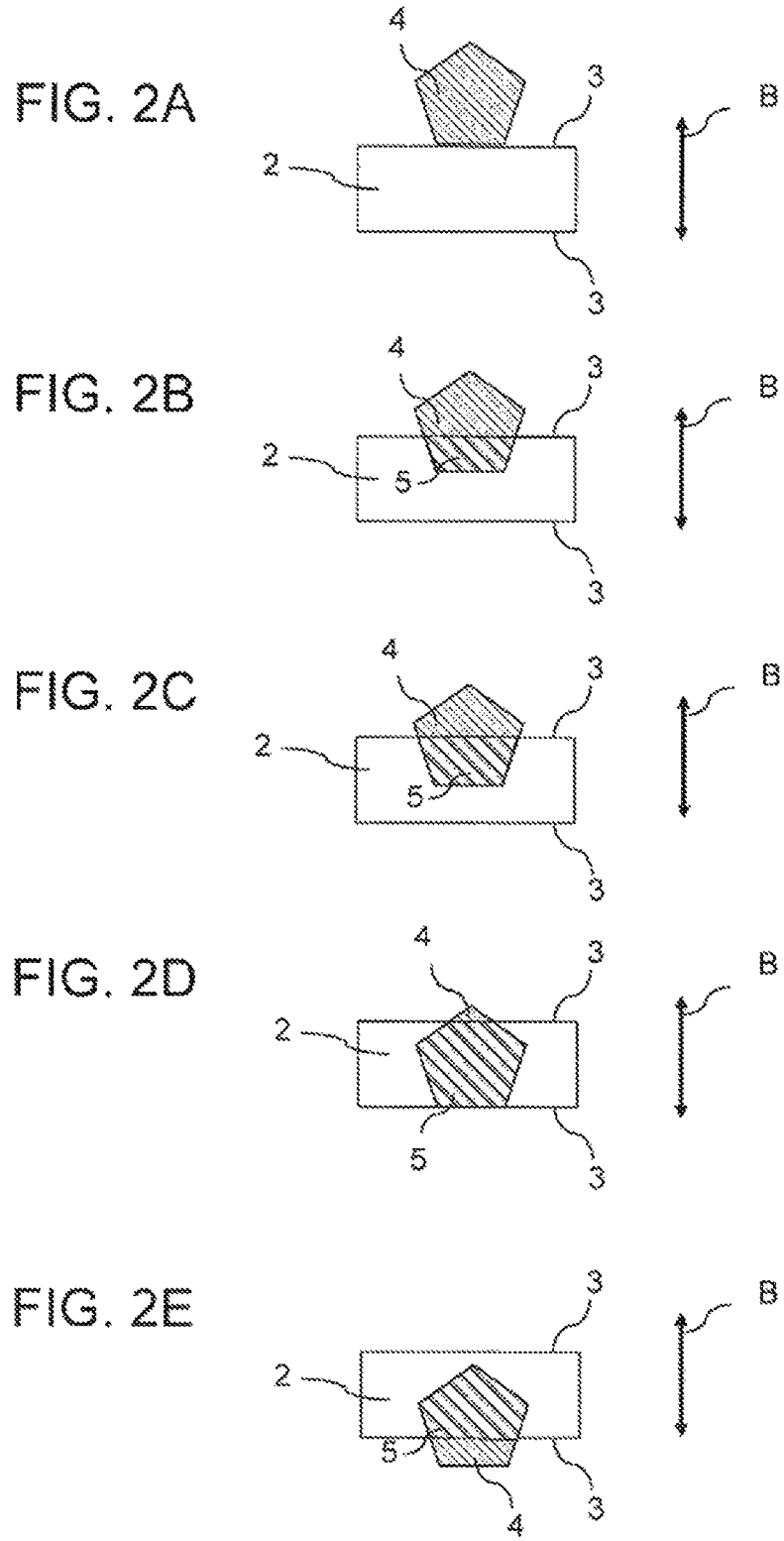
FIGS. 2A-2E schematically show different opening cross sections as a function of the piston position, according to one exemplary embodiment of the present invention.

FIG. 2A illustrates a first position of the piston 6, at an idle engine speed or in a low engine speed range, where there is no demand for cooling oil or only a low demand for cooling oil. In this case, the pressurized lubricating oil entering via the lubricant feed 10 exerts a low pressure force on the piston 6, which does not overcome the preload force of the spring 11. The piston 6 and radial opening 4 are thus arranged in an upper closed position in which there is no overlap between the radial opening 4 and the passage opening, such that the piston skirt 9 closes off the passage opening 2.

With increasing engine speed, the lubricant pressure increases and thus the pressure force exerted on the piston 6 increases. FIG. 2B illustrates a state of the control valve 1 in an engine speed range elevated in relation to FIG. 2A, in which the pressure force exerted by the lubricant on the piston 6 is greater than the preload force exerted on the piston 6 by the spring 11. In this state, the spring 11 is compressed slightly and the piston 6 is moved downward slightly in the sliding bushing 7 along the movement direction B, such that the radial opening 4 protrudes beyond the upper opening edge 3 of the passage opening. The region of overlap between the radial opening 4 and the passage opening 2 forms an opening cross section 5, denoted by the hatching with the thick lines. If the pressure force acting on the piston 6 falls below the preload force exerted on the piston 6 by the spring 11 again, the piston 6 is moved by the spring 11 back into a position of FIG. 2A, in which said piston fluidically closes, or partially closes, the passage opening 2.

FIGS. 2C-2E illustrate piston positions at increasing engine speeds and lubricant pressures, such that the increasing pressure force of the lubricant compresses the spring 11 to an increasing extent. Here, the radial opening 4 of the piston 6 will move past the passage opening 2 such that the overlap 5 firstly increases and, in the process, reaches its maximum in a predetermined engine speed range, as illustrated in FIG. 2D.

A particular advantage of the invention lies in the fact that, in the presence of high lubricant pressures, the piston 6 is moved into a position in which the radial opening 5 moves beyond the lower opening edge 3 of the passage opening, and the region of overlap between the radial opening 4 and the passage opening 2 decreases in size again, such that the opening cross section 5 is reduced again. This is illustrated in FIG. 2E. An excessive increase in cooling oil flow rate can be prevented in this way.

Figure 3:
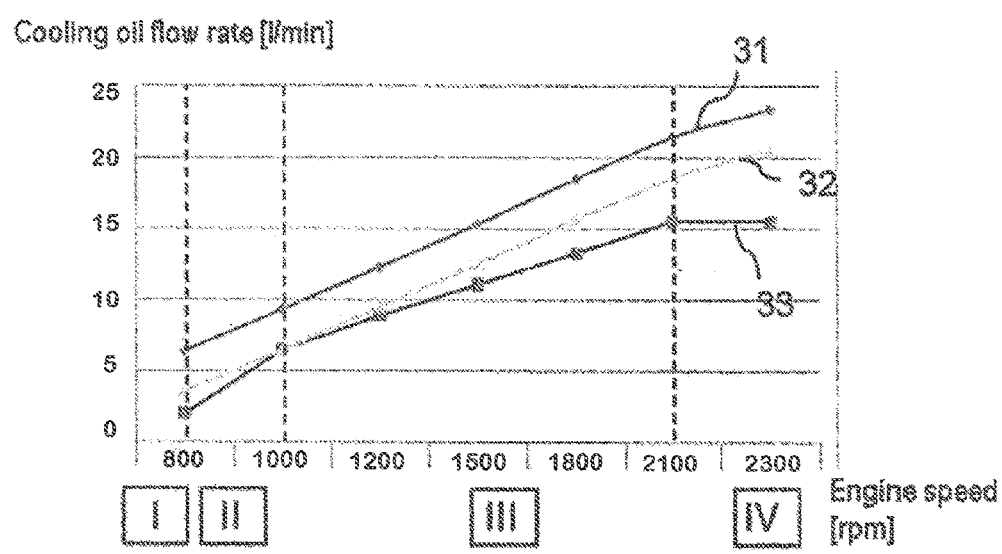
FIG. 3 shows a profile diagram illustrating the oil throughput as a function of the engine speed for different oil spray nozzles.

This is explained by way of example on the basis of the diagram of FIG. 3, which shows the oil throughput as a function of the engine speed for different oil spray nozzles. The curve 31 shows the engine-speed-dependent oil throughput for a conventional unregulated oil spray nozzle and curve 32 shows the engine-speed-dependent oil throughput for an optimized unregulated oil spray nozzle. The curve 33 shows the engine-speed-dependent oil throughput for an oil spray nozzle controlled by the control valve 1 according to the present invention.

The region I shows the oil throughput at the idle engine speed, in which the piston 6 of the control valve 1 is in a position in which it closes off the passage opening 2 (see also FIG. 2A), such that sufficient oil for engine lubrication points is made available.

In the lower engine speed range (range II, see also FIG. 2B), there is a low cooling oil demand, such that a small opening cross section 5 is opened up. In the middle engine speed range III (see also FIGS. 2C and 2D), the opening cross section 5 is progressively increased, owing to the rising oil pressure, up to a maximum opening cross section (see FIG. 2D). The curve 33 thus has a rising profile in the range III.

In the upper engine speed range IV (see also FIG. 2E), further movement of the piston 6 causes the opening cross section 5 to be successively reduced again, so as to yield a substantially constant lubricant throughput through the passage opening 2, as indicated by the constant profile of the curve 33 in the range IV.

By contrast to the curves 31 and 32, it is thus possible for an excessive increase in lubricant throughput in the upper engine speed and pressure range to be prevented.

Figure 4A:
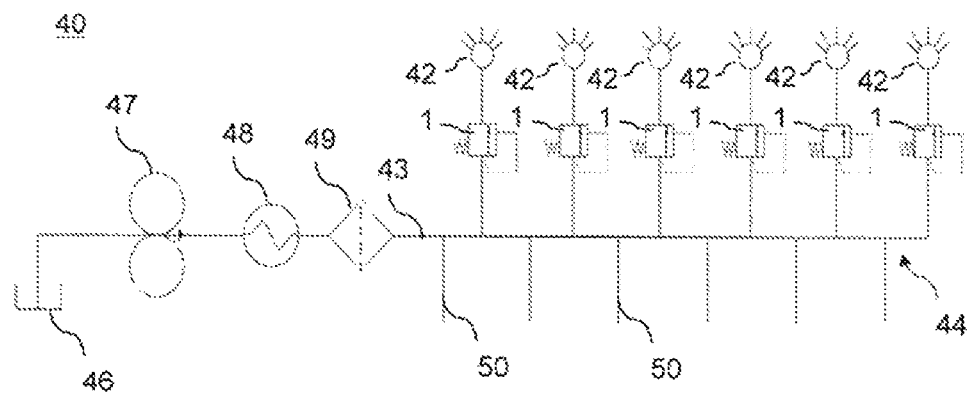
FIG. 4A is a schematic diagram of a lubricant supply device with control valves in decentralized configuration, according to one exemplary embodiment of the present invention.
Figure 4B:
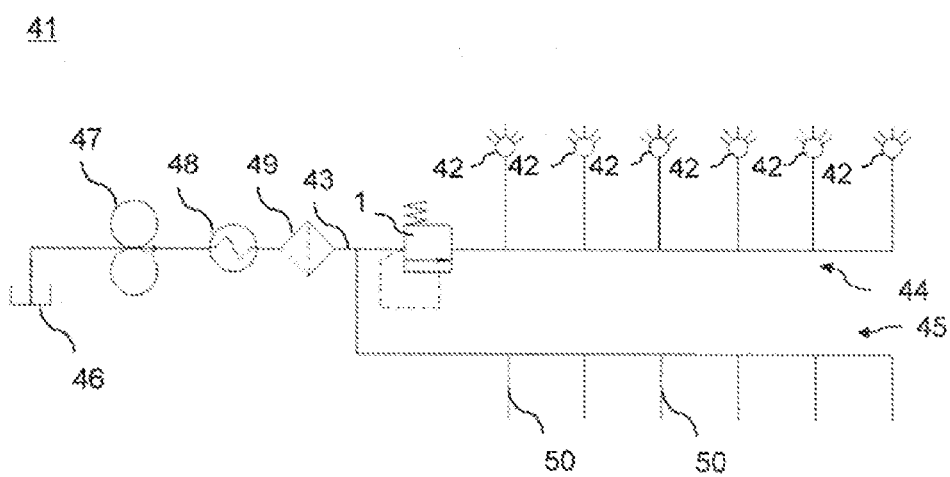
FIG. 4B is a schematic diagram of a lubricant supply device with control valves in a central configuration according to an embodiment of the present invention.

FIGS. 4A and 4B show lubricant supply devices 40, 41 with the control valves 1 in a decentralized and central configuration.

In the case of the decentralized arrangement of the control valves 1 shown in FIG. 4A, a separate control valve 1 is arranged for each oil spray nozzle in order to set the flow rate of the lubricant to be supplied to the lubricant spray nozzle 42.

A constant-displacement pump 47 which is coupled to the speed of the engine (not shown) delivers the lubricant out of an oil sump 46 via a lubricant line 43. Downstream of the constant-displacement pump 47 there are arranged a heat exchanger 48, for dissipating excess heat from the oil, and a filter 49. The oil emerging from the filter 49 is fed, via an oil gallery 44, to the individual oil spray nozzles 42 via the control valves 1 and to the oil-hydraulic consumers 50.

As shown in the lubricant supply device 42 of FIG. 4B, a central arrangement of one control valve 1 for a multiplicity of oil spray nozzles 42 is also possible. For this purpose, for the supply to the consumers 50, an oil gallery 45 is provided which is separate from the oil gallery 44 for the oil spray nozzles 42 and which is supplied with oil upstream of the central control valve 1.

Even though the invention has been described with reference to particular exemplary embodiments, numerous variants and modifications are possible which likewise make use of the concept according to the invention and which thus fall within the scope of protection. Furthermore, numerous modifications may be made in order to adapt the control valve to the engine-specific cooling oil flow rate demand. Consequently, it is not the intention for the invention to be restricted to the particular exemplary embodiment disclosed; instead, it is the intention for the invention to encompass all exemplary embodiments that fall within the scope of the appended patent claims.

The invention claimed is:

1. A control valve for a lubricant nozzle for cooling a piston of an internal combustion engine, having
    a housing with at least one passage opening through which lubricant can flow;
    a control part movable in a respective movement direction and which, forms an opening cross section with the passage opening as a function of a position of the control part relative to the passage opening, for at least partially opening up or for closing off the passage opening; and
    an actuation part that moves the control part as a function of a pressure of the lubricant between a first position in the presence of a first pressure, a second position in the presence of a second pressure and a third position in the presence of a third pressure of the lubricant, wherein the second pressure is higher than the first pressure and lower than the third pressure, wherein the opening cross section formed in the second position is larger than the opening cross sections in the first position and in the third position.

2. The control valve according to claim 1, wherein the opening cross section is at a maximum in a range of medium pressure of the lubricant.

3. The control valve according to claim 1, wherein the control part is movable in continuous fashion between the first, second and third positions, and the actuation part is designed to set the position of the control part and the opening cross section, such that a gradient of a lubricant throughput is smaller in an upper pressure range of the lubricant than in a medium pressure range of the lubricant.

4. The control valve according to claim 1, wherein the control part is movable in continuous fashion between the first, second and third positions, and the actuation part sets the position of the control part and the opening cross section, such that a substantially constant or reduced lubricant throughput through the passage opening is realized in an upper pressure range of the lubricant.

5. The control valve according to claim 1, wherein the pressure force exerted by the lubricant on the control part acts on the control part at least substantially in a direction of one of the movement directions of said control part.

6. The control valve according to claim 1, wherein the control part is a piston guided within a sliding bushing of the housing, and the passage opening is provided in the sliding bushing.

7. The control valve according to claim 6, wherein the piston has a piston skirt with a radial opening through which lubricant can flow, one side of the radial opening being connected in communicating fashion via a piston interior to a lubricant feed and the other side, when the piston is in a predetermined position range, forming a communicating connection to the passage opening, wherein the opening cross section is formed from an overlap of the passage opening and of the radial opening.

8. The control valve according to claim 7, wherein with increasing pressure of the lubricant the piston is moved toward the actuation part such that the radial opening is moved past the passage opening, and such that the overlap increases from the first to the second position and subsequently decreases again from the second to the third position.

9. The control valve according to claim 1, wherein the actuation part is a spring element, the position of the control part being moved under an action of spring force exerted by the spring element.

10. The control valve according to claim 1, wherein the passage opening is formed by an annular duct or an annular groove introduced into the control valve housing and into a further component.

11. A lubricant spray nozzle comprising a control valve according to claim 1.

12. A lubricant supply device for a reciprocating-piston engine of a motor vehicle, comprising:
    at least one lubricant spray nozzle by means of which at least one piston of the reciprocating-piston engine can be sprayed with lubricant, and
    at least one lubricant feed configured to feed the lubricant to the lubricant spray nozzle, the at least one lubricant feed having a control valve according to claim 1 arranged upstream of the at least one lubricant spray nozzle in the flow direction of the lubricant to said lubricant spray nozzle, the control valve controllable to set a flow rate of the lubricant to be fed to the lubricant spray nozzle.

13. The lubricant supply device according to claim 12, wherein the at least one lubricant spray nozzle comprises a plurality of lubricant spray nozzles, said control valve including a separate control valve arranged upstream of each lubricant spray nozzle of the plurality of spray nozzles such that the lubricant flow rate fed is set independently for each one of the plurality lubricant spray nozzles.

14. The lubricant supply device according to claim 12, wherein the at least one lubricant spray nozzle comprises a plurality of lubricant spray nozzles said control valve is a central control valve arranged in a lubricant gallery such that the lubricant flow rate fed is set for all of the plurality of lubricant spray nozzles.

15. An internal combustion engine for a motor vehicle having a lubricant supply device according to claim 12.

* * * * *